UNITED STATES PATENT OFFICE 2,494,514

PRODUCTION OF THE AMYLASE OF BACILLUS MACERANS

Robert Winston Liggett and Wayne C. Mussulman, Decatur, Ill., assignors to A. E. Staley Manufacturing Company, Decatur, Ill., a corporation of Delaware No Drawing. Application May 10, 1946, Serial No. 668,784

4 Claims. (Cl. 195—67)

This invention relates to improvements in those nutrient media in which *Bacillus macerans* evolves an amylase characterized by ability to degrade starch in part to crystalline non-reducing substances known as "Schardinger" dextrins. More specifically, it pertains to the supplementing of such media with a material that furnishes ammonium ions to the culture medium, whereby rate of enzyme development is greatly increased, and the provision and use of the improved media for speeding up the amylase production are principal objects of this invention.

It is known that *Bacillus macerans* will not develop significant concentrations of its amylase in all of the media in which it will grow. For example, it has been reported that the bacteria produce no detectable characteristic amylase when cultured in ordinary laboratory media such as beef-infusion broth and peptone water, with or without addition of starch. The amylase was first detected in white or Irish potato cultures of the bacteria buffered with calcium carbonate. Subsequently, it was found that oatmeal and corn meal, preferably the former, are equivalents of potato in promoting formation of the enzyme. Addition of potato, oatmeal, or corn meal to media in which the bacteria are growing, but are not producing amylase, such as the previously mentioned beef broth and peptone water, also causes formation of the enzyme.

According to culturing methods hitherto disclosed, development of maximum concentration of amylase in the nutrient medium, under the known optimum culturing conditions, requires a considerable length of time. As reported by E. B. Tilden and C. S. Hudson in the Journal of Bacteriology, volume 43, pages 527–544 (1942), in a study of the optimum cultural conditions for production of the enzyme, the culturing period required for development of maximum enzyme concentration averages three to four weeks, but occasionally it is as short as ten to fourteen days.

The present invention is based on the unexpected discovery that the rate of amylase production by *Bacillus macerans* growing in those nutrient media that support amylase development is greatly increased by incorporating in those media a material that will furnish ammonium ions therein. Satisfactory materials for this purpose are soluble non-toxic ammonium salts and nitrogenous materials, such as corn steepwater for example, that contain ammonium ions. Also, probably, these latter materials contain amides that are hydrolyzed during the bacterial growth in the nutrient media thereby producing further ammonium ions. Aqueous or anhydrous ammonia can also be used, but since optimum amylase production by the organism is confined to a nutrient medium pH range of about 6.5 to 7.0, the added ammonia must be suitably neutralized, which is equivalent to adding an ammonium salt.

The invention permits reduction in culturing time required for maximum development of amylase to about one-fourth or one-fifth of that formerly necessary, i. e., from a range of about fifteen to thirty days to a range of about three to seven days. No significant reduction in maximum yield of enzyme accompanies the pronounced reduction in culturing time.

From the standpoint of commercial production of the *Bacillus macerans* amylase, the advantage of the present invention over the prior art is obvious. It permits a four to five fold increase in enzyme production from a given amount of equipment or plant, thus greatly lowering the manufacturing cost of the product.

Our invention further can be illustrated by the following examples, in which all parts are by weight unless otherwise specified:

*Example 1*

A slurry of 4 parts oatmeal, 2 parts powdered calcium carbonate, 0.2 part ammonium sulfate and 94 parts water was sterilized in the usual manner, inoculated with 0.1 part of a potato culture of *Bacillus macerans*, and incubated at 40° C. A maximum concentration of 3.0 Tilden units of amylase per milliliter of nutrient medium was reached in five days. A control example, in which the ammonium sulfate was omitted, showed less than 0.5 Tilden units of amylase per milliliter of substrate at the end of five days.

Equivalents of ammonium sulfate in the above example are the non-toxic soluble ammonium salts in general. Examples of these are the nitrate, chloride, perchlorate, and acetate.

*Example 2*

The ammonium sulfate in Example 1 was replaced with 0.5 part of corn steep liquor solids, and incubation at 40° C. was continued for seven days. At the end of this time, a maximum concentration of 3.5 Tilden units of amylase per milliliter of nutrient medium was developed.

As noted above, optimum culturing conditions, particularly with respect to temperature and pH, have been reported by Tilden and Hudson. Calcium carbonate is the preferred buffer for maintaining the nutrient medium at the optimum pH range of about 6.5 to 7.0.

Based on total nutrient medium, the preferred percentages of oatmeal (or whole potato) solids, calcium carbonate, and ammonium ions are 2–6, 1–4, and 0.02–0.3, respectively. Satisfactory results may be obtained, however, over somewhat wider ranges of these ingredient proportions. They are, in the above order of ingredients, about 0.1 to 10 per cent, 0.1 to 10 per cent, and 0.01 to 1.5 per cent.

As used hereinbefore and in the appended claims, the following terms have the specified meanings:

*Oatmeal.*—Either hulled or unhulled oat material which may be bone dry or contain a variable percentage of moisture. Preferably this material should be in a rolled or comminuted state so as to be more available to the bacteria.

*Potato, whole potato.*—Synonymous terms referring to the white or Irish potato, and including the peeled or unpeeled tuber, or portions thereof, with or without its usual moisture content.

*Amylase.*—The starch liquefying enzyme produced by *Bacillus macerans* under favorable cultural conditions, and characterized by ability to convert starch in part to soluble non-reducing crystalline substances of lower molecular weight known as "Schardinger" dextrins.

Since certain changes in carrying out the above process, and certain modifications in the product which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention what we claim as new and desire to secure by Letters Patent is:

1. In the production of amylase by culturing *Bacillus macerans* in nutrient media that support development of said amylase, the improvement which comprises incorporating in the nutrient media at least one member of the group consisting of a non-toxic ionizable ammonium salt and corn steepwater solids containing ammonium ions, the proportion of said incorporated material being such that it furnishes to the nutrient media a concentration of ammonium ions in the range of 0.01 to 1.5 per cent.

2. In the production of amylase by culturing *Bacillus macerans* in nutrient media containing oatmeal, the improvement which comprises incorporating in the nutrient media at least one member of the group consisting of a non-toxic ionizable ammonium salt and corn steepwater solids containing ammonium ions, the proportion of said incorporated material being such that it furnishes to the nutrient media a concentration of ammonium ions in the range of 0.01 to 1.5 per cent.

3. In the production of amylase by culturing *Bacillus macerans* in nutrient media containing potato, the improvement which comprises incorporating in the nutrient media at least one member of the group consisting of a non-toxic ionizable ammonium salt and corn steepwater solids containing ammonium ions, the proportion of said incorporated material being such that it furnishes to the nutrient media a concentration of ammonium ions in the range of 0.01 to 1.5 per cent.

4. In the production of amylase by culturing *Bacillus macerans* in nutrient media containing corn meal, the improvement which comprises incorporating in the nutrient media at least one member of the group consisting of a non-toxic ionizable ammonium salt and corn steepwater solids containing ammonium ions, the proportion of said incorporated material being such that it furnishes to the nutrient media a concentration of ammonium ions in the range of 0.01 to 1.5 per cent.

ROBERT WINSTON LIGGETT.
WAYNE C. MUSSULMAN.

REFERENCES CITED

The following references are of record in the file of this patent:

UNITED STATES PATENTS

| Number | Name | Date |
|---|---|---|
| 2,219,426 | Loughlin | Oct. 29, 1940 |

OTHER REFERENCES

Tilden et al.: Jour. of Bacteriology (1942), 43, 527–44.

Tilden et al.: Jour. Am. Chem. Soc. (1942), 64, 1432–1433.